A. KINNINGS.
VARIABLE GEARING.
APPLICATION FILED NOV. 8, 1909.
1,006,101.
Patented Oct. 17, 1911.
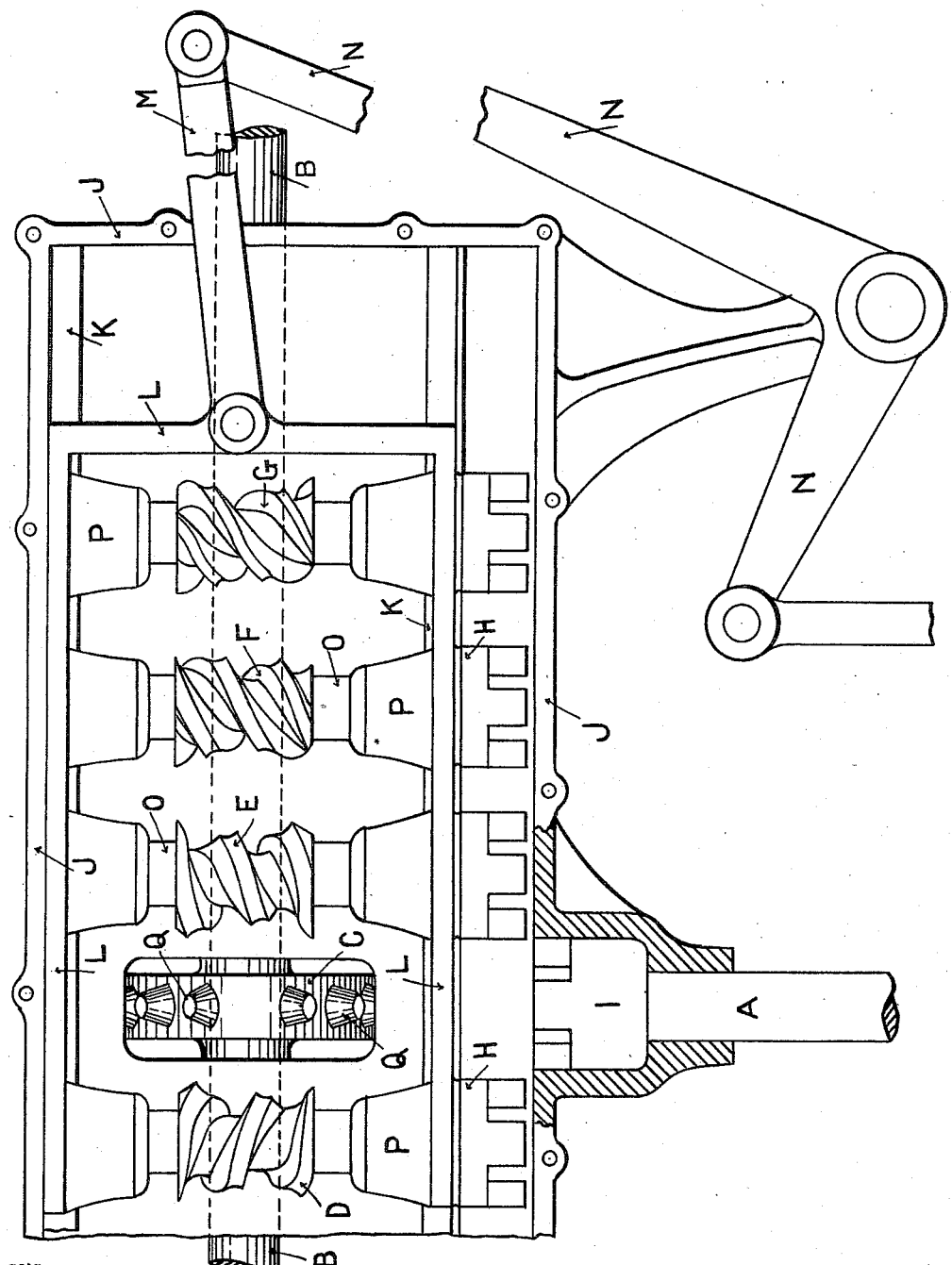

ized to make and use the same.
UNITED STATES PATENT OFFICE.

ARNOLD KINNINGS, OF SOUTHPORT, ENGLAND.

VARIABLE GEARING.

1,006,101. Specification of Letters Patent. Patented Oct. 17, 1911.

Application filed November 8, 1909. Serial No. 526,797.

*To all whom it may concern:*

Be it known that I, ARNOLD KINNINGS, a subject of the King of England, residing at 113 Eastbank street, Southport, in the county of Lancaster, England, have invented certain new and useful Improvements in Variable Gearings; and I do hereby declare the following to be a full, clear, and exact description of the invention, such as will enable others skilled in the art to which it appertains to make and use the same.

This invention has for its object an improved change speed or variable gearing which will provide a quiet and efficient drive on all speeds and in either direction.

In carrying out my invention I provide a box which is capable of a radial or reciprocating movement and in which is mounted side by side a series of worms adapted to engage in their turn with a common toothed wheel which preferably has revoluble teeth of any suitable form, and is mounted on the driven shaft. Each worm is independent from and not geared to the others and the axis of each is parallel to all the rest and at right angles to the axis of the driven worm wheel. The change of speed is obtained by bringing one or other of such worms into engagement with the aforementioned toothed wheel the threads of each of such worms having a different angularity or lead from the others. The reverse motion of the driven shaft is obtained by forming one or more of the worms with a thread arranged in the opposite direction to the others and meshing with the toothed wheel in the same manner as the others. Suitable clutch mechanism is employed to couple the driving shaft to that worm which is in mesh for the time being, the other worms being idle.

The drawing illustrates my invention as applicable to the gear box of a motor vehicle.

A represents the motor or driving shaft and B the axle or driven shaft.

C is a toothed wheel that acts as a worm wheel keyed or otherwise longitudinally secured to the shaft B, and D, E, F, G, represent globoid worms.

Globoid worms are worms with flaring engaging surfaces and of themselves form no part of my invention. Each worm has a clutch H adapted to engage (one at a time) with a corresponding clutch I on the shaft A and to be rotated thereby and to transmit the motion to the wheel C in obvious manner.

J is a box or casing and K are guides or slides in which a frame L is carried and is free to be reciprocated at desired intervals by means of a pitman M actuated in the example shown by a bell crank lever N. The function of this frame L is to carry the worms D, E, F, G, and so place them as to allow any one of them to be put in mesh with the wheel C and driving shaft A. The spindles O of the various worms are supported in bushes P. The teeth Q of the wheel C are conical in shape and are free to revolve individually each on its own axis and this materially reduces friction. The longitudinal section of the teeth Q is approximately the same as the section of the spaces between the threads.

Referring now more particularly to the worms D, E, F, G. It will be noticed that the worm D is left handed while the remainder are right handed, and the former is used for "reverse" and is preferably so cut as to give a comparatively slow drive. The worm E gives a slow forward drive. F gives a quicker drive, and G the quickest drive. I do not wish to be confined to any particular number of speed changes.

It should be understood that the diameters of all the worms are equal as is also the cross section of the spaces between all the threads on them taken as on a line at right angles to the thread so that any one may be placed in mesh with the wheel C, but while the worms D and E have each but a single thread and consequently only one start or entrance per revolution, the worm F has two threads and the worm G three threads with a corresponding number of starts or entrances of threads into the wheel C per revolution. The worms are of what is known as "globoid" formation to insure good distribution of driving contact.

The mode of action is as follows. The clutch I is meshed with any one of the clutches H according to the speed and direction desired. Should a change of direction or speed be wanted the clutch I is withdrawn (in which position it is shown in the drawing) and the frame L is slid along the guides K until the requisite worm is in mesh with wheel C, and in position to be coupled to the driving shaft A. The clutch I is then placed in mesh with the worm clutch H opposite to it.

Although I have shown the frame L as sliding in parallel straight guides the parts may be arranged so as to move radially. In this latter case the guides may be omitted and the frame L be shaped like a circle or segment of a circle pivoted at about its center in obvious manner. In any case the bodily movement of the worms is in a plane at right angles to the axis of the driven shaft.

I claim:

1. In a variable gearing, a driving shaft, a driven shaft, a worm wheel carried by the driven shaft, a series of worms having threads of different pitch but the same direction, another worm with a thread of different direction from that of the series of worms, means to move the series of worms parallel to the axis of the worm wheel to bring any one of the worms into mesh with the worm wheel, and means to couple such worm with the driving shaft.

2. In a variable gearing, a driving shaft, a driven shaft, a gear member carried by one of the shafts, a frame, a series of gear members of different pitch mounted in the frame and movable in a direction parallel to the axis of the worm wheel to and from a position in mesh with the first gear member, means to move the frame to bring one of the series into mesh with the first gear member carried by one of the shafts, and a clutch arranged to couple the other shaft with such gear member of the series.

3. In a variable gearing, a driving shaft, a driven shaft, a gear member carried by the driven shaft, a frame, a series of forward-drive gear members mounted in the frame and having different pitch, another gear for reverse-drive also mounted in the frame, means to move the frame to bring one of the forward-drive gears or the reverse-drive gear into mesh with the gear carried by the driven shaft, and a clutch to couple the driving shaft with such gear.

4. In a variable gearing, a driving shaft, a driven shaft, a worm wheel carried by the driven shaft, a series of worms having threads of different pitch but the same direction, another worm with a thread of different direction from that of the series of worms, a frame having the several worms mounted therein and capable of being displaced in a plane parallel to the axis of the worm wheel to bring one of the worms into mesh with the gear on the driven shaft, and a clutch arranged to couple the driving shaft with such worm.

5. In a variable gearing, a driving shaft, a driven shaft, a worm wheel carried by the driven shaft, a casing, a frame guided within the casing for movement parallel with the axis of the worm wheel, a series of worms mounted side by side in the frame, a plurality of the worms having threads of the same direction but different pitch and one of the worms having a thread of a direction different from that of the other worms, means to move the frame within the casing to bring one of the worms into engagement with the worm wheel, and a clutch to couple such worm with the driving shaft.

6. In a variable gearing, a driving shaft, a driven shaft, a worm wheel carried by the driven shaft in line with the driving shaft, a casing, a frame guided within the casing for movement at right angles to the driving shaft, a series of worms mounted side by side in the frame, one of the worms having a single thread for reverse-drive, one of the worms having a single thread in a different direction for forward-drive, and a plurality of the worms having multiple threads of different pitch but the same direction as the last named worm for forward-drive at varying speeds, means to move the frame to bring one of the worms into mesh with the worm wheel and means to couple the driving shaft to such worm.

7. In a variable gearing of the type specified the combination with the driving shaft of a single threaded left handed globoid worm, a single threaded globoid right handed worm, a double threaded and one or more other multiple threaded globoid worms of the same direction, a frame, and a toothed wheel, all of said worms being mounted side by side in the frame, which frame may be slid along supporting guides in such manner that any one may be brought into mesh with the toothed wheel and at the same time into position for clutching with the driving shaft, substantially as described.

8. A variable or change speed gearing consisting of a frame or box, a toothed wheel having revoluble teeth, a driven shaft carrying the toothed wheel, a series of globoid worms the threads of which are of different angularity or lead mounted side by side in the frame or box capable of a reciprocating movement which will bring any one of such worms into mesh with the common toothed wheel suitable clutch mechanism being provided to couple the driving shaft to that worm which is in mesh with said wheel for the time being, substantially as described.

In testimony whereof I hereunto affix my signature in the presence of two witnesses.

ARNOLD KINNINGS.

Witnesses:
H. WILLIAMS,
H. WATSON.